United States Patent Office 3,524,831
Patented Aug. 18, 1970

3,524,831
NOVEL ORGANOTIN COMPOSITIONS AND RESINS STABILIZED THEREWITH
Christian H. Stapfer, Newtown, Pa., assignor to Carlisle Chemical Works, Inc., Reading, Ohio, a corporation of Ohio
No Drawing. Filed July 19, 1967, Ser. No. 654,347
Int. Cl. C07f 7/22; C08f 45/62
U.S. Cl. 260—30.8        6 Claims

ABSTRACT OF THE DISCLOSURE

Dialkyltin carboxylates are used as internal lubricants and costabilizers for diorganotin mercapto compounds in the stabilization of halogen-containing resins.

---

This invention relates to improved organotin mercapto stabilizer compositions and to resins containing the same.

A considerable number of reaction products or organotin compounds with mercapto acids and esters have been used or proposed as stabilizers for poly (vinyl chloride) and other halogen-containing resins, particularly for the production of rigid polyvinyl chloride. Depending on the proportions of the reactants, such reaction products of diorganotin compounds have been defined by various formulae, such as (1a)      $R'R^2Sn(SR^3COOR^4)_2$ (b) 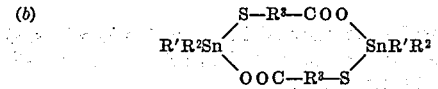

(c) 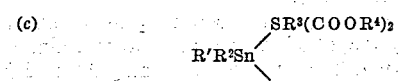

wherein R' and R² are monovalent hydrocarbons, e.g., alkyl, aryl, aralkyl, alkaryl, or cycloalkyl radicals, R³ is substituted or unsubstituted alkylene, arylene, aralkylene, or alkarylene, R4 represents hydrogen or a monovalent hydrocarbon radical like R' and Z is a member of the group consisting of OR', SR', and OOCR'.

By reaction of one mole of diorganotin oxide with two moles of a mercaptoacid ester, essentially compounds of the Formula 1(a), and by reaction of equimolar amounts of a diorganotin oxide and a mercaptoacid, essentially compounds of the Formula 1(b) can be obtained. Compound 1(c) are obtained, e.g., by reacting one mole each of diorganotin oxide, a mercaptoacid ester, and a compound R'OH, R'SH, or R'COOH.

At present, dibutyltin bis (isooctyl acetomercaptide) and dibutyltin bis (isooctyl beta propionmercaptide) are probably the mostly used organotin mercapto stabilizers. They provide very good long-term static heat stability and low melt viscosity which are necessary for the processing of rigid polyvinyl chloride. Of course, said compounds may be replaced in the future by similar diorganotin mercapto compounds of the same general character, when other such compounds become commercially available which have additional desirable properties or can be purchased at lower cost.

Similar considerations apply to the monoalkyltin monomeric and polymeric mercapto compounds.

Nonetheless, all organotin mercapto compounds, including those specifically referred to hereinabove, present the drawback of releasing unpleasant odors from the polymeric substrate during the hot processing of the resin, and even after the plastic articles are made.

It is another drawback of the organotin mercaptides and mercapto acid derivatives that they impart to resins only a limited internal lubrication. Therefore, they do not allow high rate extrusions or high temperature processing, and they can not be employed in the stabilization of rigid resins, particularly rigid poly (vinyl chloride), to the extent which their light stabilizing properties would otherwise make desirable.

It is a principal object of the invention to provide a stabilizer system in which the recited drawbacks of the organotin mercaptoester stabilizers are obviated.

Other objects and advantages will be apparent from a consideration of the specification and claims.

We have found that the presence of a diorganotin dicarboxylate group of a dicarboxylic acid having 6–12 carbon atoms in a diorganotin mercaptoacid ester, or in combination with such an ester, considerably improves the internal lubrication in the extrusion of resins stabilized therewith.

Such systems may contain a dialkyltin dicarboxylate of the general formula

2(a)

$$\left[ \begin{array}{c} R^1 \\ | \\ -Sn-OOC-(CH_2)_n-COO- \\ | \\ R^2 \end{array} \right]_m$$

wherein R¹ and R² have the same meaning as above, n is an integer from 4 to 10 and m is 2 to ∞, in addition to a diorganotin mercaptoester of the Formulae 1(a)–(c). A low value of m is preferred because it ensures good shelf stability of the liquid compounds 2(c).

However, it it is possible, to incorporate a

2(b) 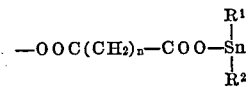

group into a dialkyltin mercaptoacid ester so as to form a compound of the formula 2(c) 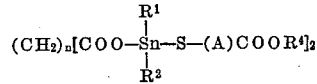

Compounds of the Formula 2(a) are obtained by simple condensation of an acid $(CH_2)_n(COOH)_2$ with a dialkyltin oxide, or with a dialkyltin dihalide in the presence of a hydrogen halide acceptor such as sodium bicarbonate. Compounds of Formula 2(c) are prepared by reacting two moles of an organotin oxide or halide with two moles of a mercaptoacid ester and 1 mole of a dicarboxylic acid. A is linear or alkyl substituted alkylene having 1 to 10 carbon atoms R¹ and R² are monovalent hydrocarbon radicals and preferably alkyl radicals having 4 to 12 carbon atoms.

In said formulae, a hydrogen atom in one or more of the CH₂ groups can be replaced by methyl. However, in agreement with our belief that the excellent internal lubricating properties of the compounds 2(a)–(c) are due to the linear character of the hydrocarbon nucleus of the dicarboxylic acids, we have found that said lubricating properties diminish with an increased number of substituting methyl groups.

Stabilizer systems containing dialkyltin mercapto acid esters and 5 to 50 percent calculated on the total composition, of the group 2(b) reduce or eliminate the mercaptan smell of the system and impart to the stabilized resins improved internal lubricity.

The systems can be used with advantage for all applications and in all resins where heretofore dialkyltin mercaptoacid derivatives have been employed. This is particularly true for the use as stabilizers for vinyl halide polymers, copolymers thereof with other ethylenically unsaturated compounds, and other chlorine containing resins, where they have been used alone or in combination with other stabilizers such as epoxy compounds and/or organic phosphites. They can also be used as lubricants for ABS resins, and for other purposes.

In all such applications, the novel stabilizer system may be used in amounts of 0.2–5.0 parts p.h. by weight of the resin in which it is used. When the system is used as an internal lubricant for the extrusion of rigid resins it will be used preferably in amounts of 0.5–3.0 parts p.h.

The following examples illustrate methods and compositions used in practicing this invention, but are not to be construed as limiting the scope thereof in respect of the compositions to be employed or the resins to which they are added.

The general procedure of carrying out the tests was as follows:

100 parts of the respective resin and an amount of the stabilizer system to be tested were processed on a two roll mill for 5 minutes at 360° F.

The stabilizing efficiency of the stabilizers were determined in conventional manner by bake oven tests where samples of the films were heated at 370° F. for 120 minutes in an air circulating oven.

Blends of similar mixtures were then extruded on a 2½ inch extruder at 390° F. and 40 r.p.m., and the extrusion rates were determined.

EXAMPLE 1

A blend of 100 parts of poly (vinyl chloride) (Geon 101–EP) with 2.5 parts of dibutyltin bis (isooctylmercaptoacetate) (45 mg. Sn) was compared with a blend of the same resin with a mixture of 1.5 parts of the same stabilizer with 0.5 part of dibutyltin azelate (40 mg. Sn).

The rate of extrusion of the first formulation was 81 pounds per hour vs. 95 pounds per hour for the second formulation.

EXAMPLE 2

A formulation containing 96 parts of polyvinylchloride resin, 4 parts of chlorinated polyethylene as impact modifier, 1.5 parts of dibutyltin bis (isooctylmercaptoacetate), and 1.0 part of dibutyltin bis (lauryl mercaptide) was compared to a similar formulation containing 1.0 part of the dibutyltin bis (isooctylmercaptoacetate) and 1.0 part of dibutyltin azelate.

The extrusion rate of the first formulation was 86.5 lbs./h., that of the second formulation 95 lbs./h.

Similar results were obtained when the dibtuyltin azelate was replaced by dibutyl n-sebacate or isosebacate, or by the dibutyltin adipate. We prefer to use the azelate because of its ready solubility in the dialkyltin mercapto-acid esters.

EXAMPLE 3

A blend of 100 parts of poly (vinyl chloride) (Geon 103–EP) with 2.5 parts of dibutyltin bis (isooctylmercaptoacetate) was compared with a blend of the same resin containing 2.0 parts of bis (carbisooctoxymethyl-thiodibutyltin) azelate. Both blends were processed on a two roll mill at 370° F. until the sticking of the resin to the mill occurred. The blend containing the azelate held three minutes longer before sticking (13 min. vs. 10 min.) indicating better processability although less stabilizer was used.

EXAMPLE 4

A blend of 100 parts of PVC resin (Geon 103–EP) and 2.5 parts of dibutyltin bis (isooctyl-3-mercaptobutyrate) was compared to a similar blend containing 2.0 parts of the azelate derivative. Extrusion rate on a 1 inch m.p.m. extruder at 400° F. at 60 r.p.m. was always about 10–20% higher for the formulation containing the dibutyltin azelate.

The long term stabilities obtained with the stabilizer systems according to the invention were essentially the same as those obtainable with the dialkyltin dimercapto-esters alone but the odor was considerably improved by the novel stabilizer system.

Similar results have been obtained with dialkyltin butylmercaptoacetate isooctyl mercapto propionate, isooctyl-3-mercaptobutyrate, and isooctyl mercapto pivalate, when used in combination with dialkyltin dicarboxylate groups.

I claim:

1. An organotin composition suitable as a combined stabilizer and internal lubricant comprising essentially a diorganotin mercapto acid ester corresponding to a formula selected from the group consisting of

and

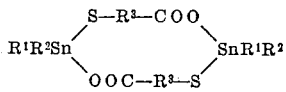

wherein $R^1$ and $R^2$ are monovalent hydrocarbons selected from the group consisting of alkyl, aryl, aralkyl, alkaryl and cycloalkyl, $R^3$ is selected from the group consisting of alkylene, arylene, aralkylene and alkarylene and $R^4$ is selected from the group consisting of alkyl, aryl, aralkyl, alkaryl and cycloalkyl; and about 5 to 50 percent, based on the composition, of a dialkyltin dicarboxylate having recurring groups corresponding to the formula

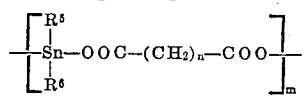

wherein $R^5$ and $R^6$ are alkyl radicals, $n$ is 4 to 10 and $m$ is 2 to ∞.

2. A composition as claimed in claim 1 wherein said dialkyltin dicarboxylate compound is soluble in said dialkyltin mercapto acid ester.

3. A halogen-containing resin containing as stabilizer 0.2 to 5 percent by weight of the composition of claim 1.

4. A rigid polyvinylchloride resin containing 0.5 to 3.0 percent by weight of the composition of claim 2.

5. A composition suitable as a combined stabilizer and internal lubricant for resins corresponding to the formula

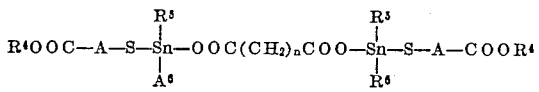

wherein $R^5$ and $R^6$ are alkyls having 4 to 12 carbon atoms, A is a member of the group consisting of linear and alkyl substituted alkylene, the number of carbon atoms being 1 to 10, $n$ is an integer of from 4 to 10 and $R^4$ is a member of the group consisting of hydrogen and monovalent hydrocarbon radicals.

6. A rigid polyvinylchloride resin containing 0.5 to 3.0 percent by weight of the composition of claim 5.

References Cited

UNITED STATES PATENTS 2,789,963    4/1957    Hecker _____ 260—45.75
3,222,317    12/1965   Kauder _____ 260—45.75

FOREIGN PATENTS 1,018,111    1/1966    Great Britain.

DONALD E. CZAJA, Primary Examiner

V. P. HOKE, Assistant Examiner

U.S. Cl. X.R.

252—406; 260—45.75, 429.7